United States Patent [19]

Nagaoka

[11] Patent Number: 5,415,294
[45] Date of Patent: May 16, 1995

[54] SCREEN WITH A SURFACE HAVING PROJECTIONS OR DEPRESSIONS

[75] Inventor: Tadayoshi Nagaoka, Mihara, Japan
[73] Assignee: Nagaoka International Corp., Japan
[21] Appl. No.: 187,791
[22] Filed: Jan. 26, 1994

Related U.S. Application Data

[63] Continuation of Ser. No. 926,968, Aug. 7, 1992, abandoned.

[30] Foreign Application Priority Data

Aug. 16, 1991 [JP] Japan .............................. 3-072444 U

[51] Int. Cl.6 ............................................. B07B 1/49
[52] U.S. Cl. .................................... 209/393; 209/395; 209/400
[58] Field of Search ............... 209/665, 674, 683, 288, 209/400, 395, 393, 279, 616, 45, 700

[56] References Cited

U.S. PATENT DOCUMENTS

| | | | |
|---|---|---|---|
| 200,433 | 2/1878 | Cavanaugh | 209/395 |
| 744,864 | 11/1903 | Houghton | 209/393 X |
| 1,360,125 | 11/1920 | McBride | 209/393 X |
| 2,138,529 | 11/1938 | Thys | 209/45 |
| 2,226,009 | 12/1940 | Miller | 209/45 |
| 2,288,883 | 7/1942 | Bixby | 209/393 |
| 2,314,880 | 3/1943 | Heller | 209/400 |
| 3,037,630 | 6/1962 | Bixby | 209/400 X |
| 3,116,239 | 12/1963 | Bixby | 209/400 |
| 3,154,459 | 10/1964 | Cranston | 198/848 |
| 3,327,853 | 6/1967 | Bixby | 209/395 |
| 3,368,663 | 2/1968 | Kufferath | 198/848 |
| 3,526,207 | 9/1970 | Nadelson | 198/699.1 |
| 3,666,091 | 5/1972 | Ludlum | 209/45 |
| 3,805,955 | 4/1974 | Bixby et al. | 209/395 |
| 4,249,653 | 2/1981 | Kufferath-Kassner | 198/848 |
| 4,318,469 | 3/1982 | Kufferath-Kassner | 198/848 |
| 4,396,503 | 8/1983 | Schmidt | 209/393 |
| 4,911,827 | 3/1990 | Ryan et al. | 209/700 |
| 5,158,171 | 10/1992 | Graff | 198/848 |

FOREIGN PATENT DOCUMENTS

| | | | |
|---|---|---|---|
| 1102336 | 10/1955 | France | 209/393 |
| 0969759 | 7/1958 | Germany | 209/393 |
| 1051726 | 2/1959 | Germany | 198/848 |
| 9108129 | 10/1991 | Germany . | |
| 0004556 | of 1890 | United Kingdom | 209/393 |
| 770980 | 3/1957 | United Kingdom . | |
| 814812 | 3/1981 | U.S.S.R. | 198/848 |

*Primary Examiner*—D. Glenn Dayoan
*Attorney, Agent, or Firm*—Hedman, Gibson & Costigan

[57] ABSTRACT

A screen suitable for use in a device for separating solid from liquid is made of a plurality of screen wires each of which is formed on the facial surface thereof with a plurality of projections or depressions. The screen may be additionally formed on the side surfaces thereof with a plurality of projections. The screen can effectively trap solid by the projections or depressions formed on the surfaces thereof.

18 Claims, 4 Drawing Sheets

SCREEN WITH A SURFACE HAVING PROJECTIONS OR DEPRESSIONS

This is a continuation of Ser. No. 07/926,968, filed Aug. 7, 1992, now abandoned.

BACKGROUND OF THE INVENTION

This invention relates to a screen suitable for use in a profeed washer and other machine or equipment used for separating a mixture of liquid and sol id materials into liquid and solid.

In the paper manufacturing industry, a profeed washer is used for washing pulp mat which is a raw material for paper. A conventional profeed washer is made by providing a wire-netting on a circumferential surface of a hollow rotary drum. Liquids raw material for paper including pulp is supplied over this rotary drum and washed. After washing, liquid in the raw material fails to the inside of the rotary drum, passing through the wire-netting and is collected from the inside of the rotary drum whereas pulp fiber is trapped by the wire-netting and is moved by the rotation of the rotary drum and is collected at a pulp collecting section.

In the conventional profeed washer including a rotary drum provided with a wire-netting, fiber in the raw material for paper is trapped in a desired manner by the wire-netting and is smoothly collected. The wire-netting, however, has the disadvantage that the diameter of metal wire constituting the wire-netting is relatively small and hence the wire-netting is vulnerable to corrosion and wear with resulting insufficiency in durability. This poses a serious problem in the conventional profeed washer.

Machines and equipments other than a profeed washer using a moving body such as a rotary drum provided with a wire-netting for separating mixture of solid and liquid into solid and liquid face with the same problem of lack in durability of the wire-netting used in these machines and equipments.

It is, therefore, an object of the invention to solve the above described problem in a machine or equipment such as a profeed washer using a moving body provided with a wire-netting for separating solid from liquid by providing a novel element which, instead of wire-netting, can collect solid effectively and yet has sufficient durability.

SUMMARY OF THE INVENTION

For achieving the above described object of the invention, a screen according to the invention is made of a plurality of screen wires each of which is formed on the facial surface thereof with a plurality of projections and/or depressions at proper interval. Such screen may be further formed on the side surface thereof with a plurality of projections at a predetermined interval.

A screen made of a plurality of screen wires such as wedge wires arranged in parallel with a slit of a predetermined width defined between respective adjacent screen wires is well known. This type of screen generally has screen wires of a much larger diameter than a wire of wire-netting and hence has a much higher durability. As a result of a test for using such wire screen instead of wire-netting on a rotary drum, however, it has been found that the facial surface (i.e., the surface which comes into contact with raw material for paper when used in a profeed washer) of the screen wire of such wire screen is so flat and smooth that, when the wife screen is provided on the rotary drum, a substantial portion of solid including pulp fiber supplied onto a rising screen portion of the rotating rotary drum is not trapped on the facial surface of the screen wires but slips down along the surface of the screen. As a result, it has been found that ratio of collection of solid at a solid collecting section is very poor as compared with a case of using the wire-netting on the rotary drum.

According to the invention, projections and/or depressions are formed at proper interval on the facial surface of each screen wire constituting the screen and it has been found that these projections or depressions surprisingly function to trap solid such as fiber in raw material for paper sufficiently and thereby enable the solid to be moved with a movement of a moving body such as a rotary drum to a predetermined solid collecting section as effectively as wire-netting. Thus, according to the invention, a novel screen element for a profeed washer or like device having a solid trapping ability which is as high as wire-netting and durability which is much larger than wire-netting can be provided.

The invention is applicable not only to a rotary body such as a profeed washer but also to stationary type screens and filters such as a well screen in which the screen according to the invention is expected to trap gravel filled in the well bore effectively on the screen surface.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
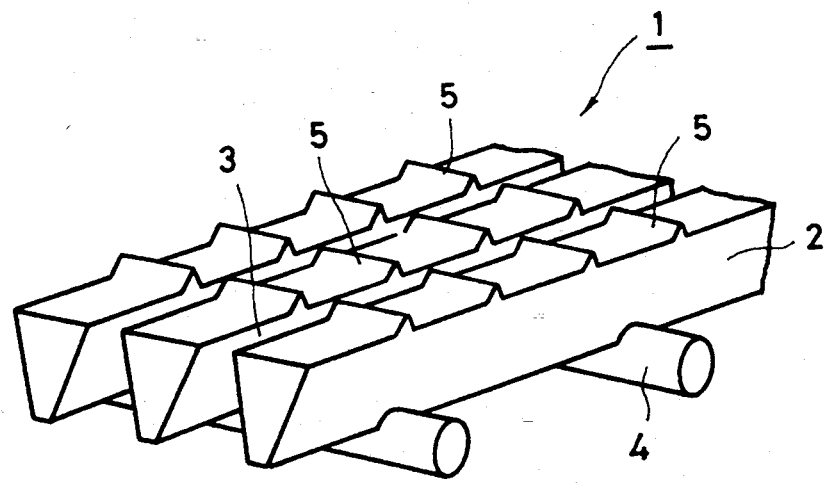
FIG. 1 is perspective view of an embodiment of the screen according to the invention.

FIG. 1 is a perspective view showing an embodiment of the invention. A screen 1 of this embodiment includes a plurality of screen wires 2 made of wedge wires which are arranged in parallel with slits 3 being formed between respective adjacent screen wires 2. These screen wires 2 are welded to support rods 4 crossing the screen wires 2.

Figure 2:
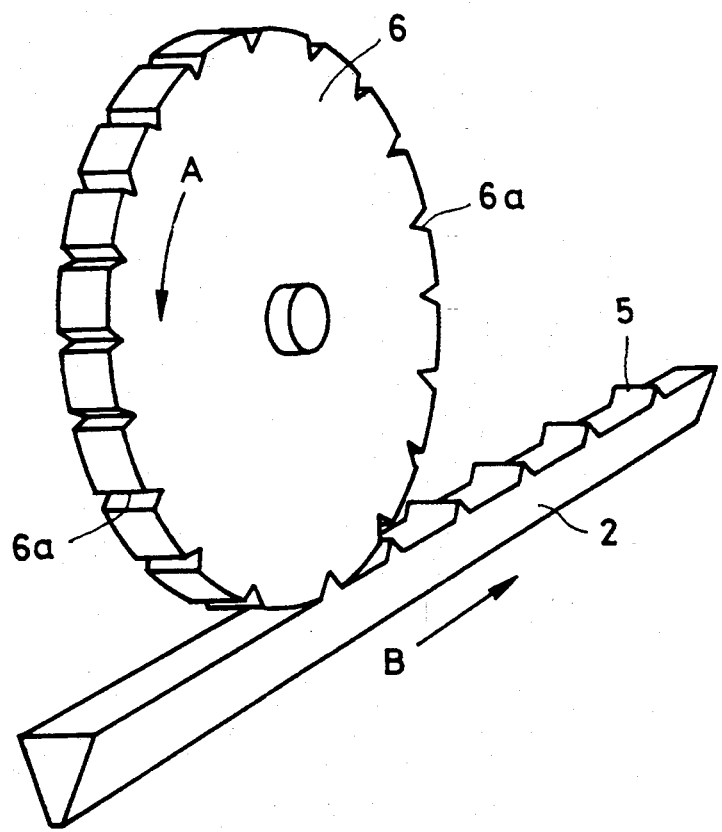
FIG. 2 is a perspective view of a method for forming projections on the screen of FIG. 1.

On the facial surface of the respective screen wires 2 are formed, at a predetermined interval, projections 5 which extend in lateral direction of the screen wire 2. These projections 5 can be formed by, for example, rotating, as shown in FIG. 2, a shape forming wheel 6 which have depressions 6a conforming to the shape of the projections 5 formed on the periphery thereof at the same interval as the interval of the projections 5 in the direction of arrow A and feeding the screen wire 2 in the direction of arrow B so as to cause the screen wire 2 to be in meshing engagement with the shape forming wheel 6.

Figure 3:
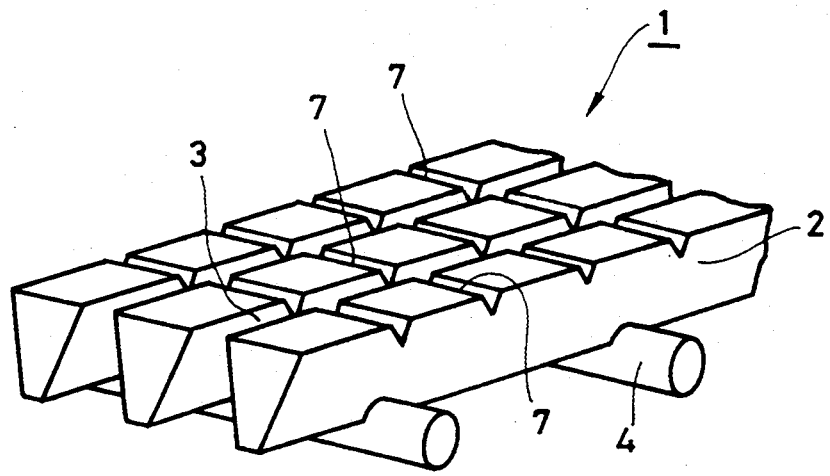
FIG. 3 is a perspective view of another embodiment of the screen according to the invention.
Figure 4:
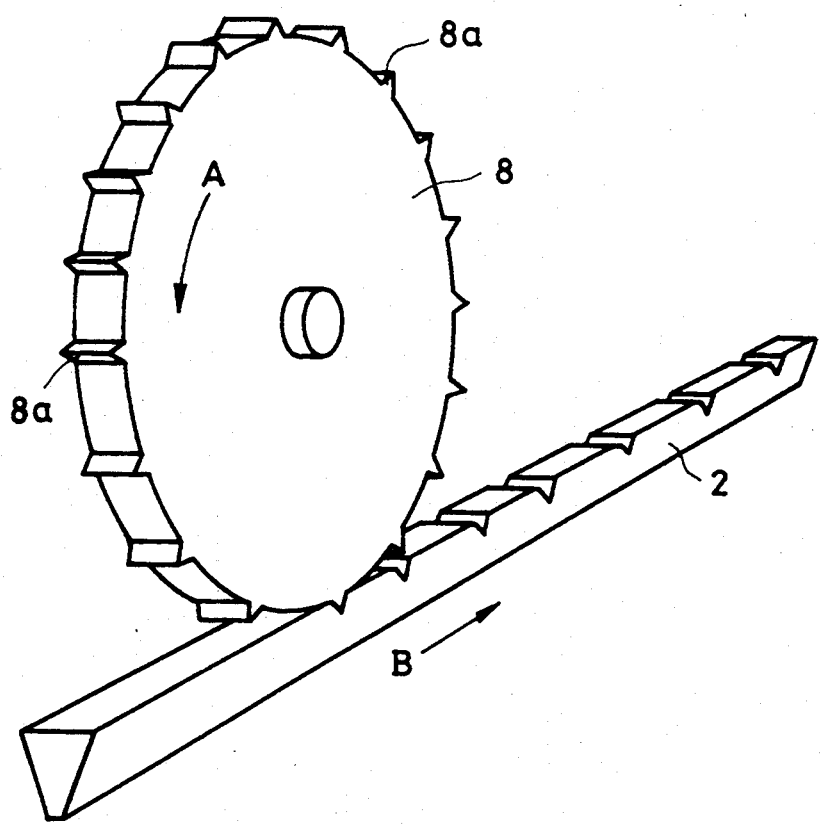
FIG. 4 is a perspective view of a method for forming depressions in the screen of FIG. 3.

FIG. 3 is a perspective view showing another embodiment of the invention. A screen 1 includes, as in the embodiment of FIG. 1, a plurality of screen wires 2 arranged in parallel with slits 3 defined between respective adjacent screen wires 2 and also includes support rods 4 to which the screen wires 2 are welded. The screen 1 of this embodiment differs from the screen 1 of FIG. 1 in that, instead of the projections, depressions 7 extending in lateral direction of the screen wire 2 are formed on the facial surface of each screen wire 2 at a predetermined interval. These depressions 7 can be formed by, for example, rotating, as shown in FIG. 4, a shape forming wheel 8 which have projections 8a conforming to the shape of the depressions 7 formed on the periphery thereof at the same interval as the interval of the depressions 7 in the direction of arrow A and feeding the screen wire 2 in the direction of arrow B so as to cause the screen wire 2 to be in meshing engagement with the shape forming wheel 8.

Figure 5:
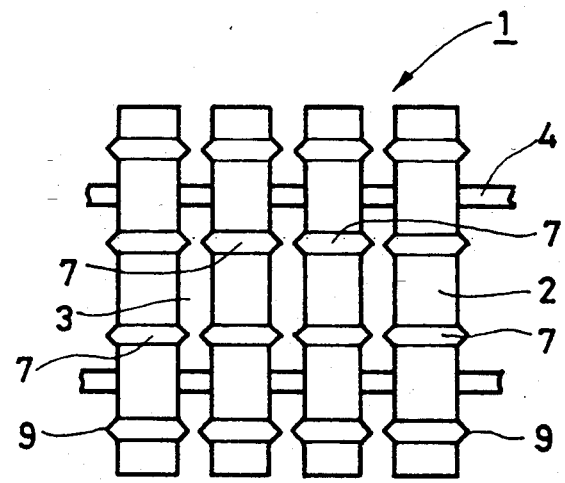
FIG. 5 is a plan view of another embodiment of the screen according to the invention.

FIG. 5 is a plan view showing another embodiment of the invention. Each screen wire 2 of the screen of this embodiment is formed on the facial surface thereof with depressions 7 in the same manner as in the embodiment of FIG. 3 and Is additionally formed on the side surface thereof with bulging portions 9 which are formed by bulging out of material of the screen wire 2 on sides of the bottom of the depressions 7 when the shape forming wheel 8 is in meshing engagement with the screen wire 2. Since these bulging portions 9 are projecting in the slits 3, a part of a solid such as fiber which has entered the slits 3 is caught by the bulging portions 9 and, as a result, the ratio of trapping solid by the screen is increased.

Figure 6:
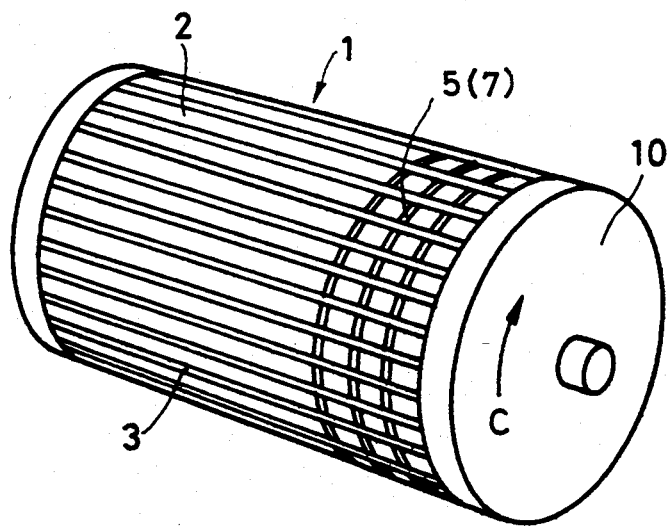
FIG. 6 is a perspective view showing a rotary drum of a profeed washer on which the screen according to the invention is provided.
Figure 7:
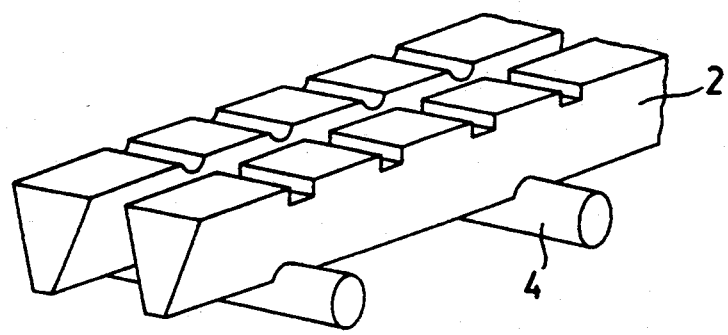
FIG. 7 is perspective view of an embodiment of a screen of the invention where one wire has square depressions and the other wire has round depressions.

FIG. 6 shows an example of profeed washer in which the screen 1 according to the invention is provided on the circumferential portion of a rotary drum 10. As this rotary drum 10 is rotated in the direction of arrow C and raw material for paper is supplied over the upper portion of the rotary drum 10, liquid portion of the raw material falls through the slits 3 of the screen 1 to the inside of the rotary drum 10 whereas fiber portion of the raw material is trapped by the projections 5 or depressions 7 (only a portion thereof is shown in FIG. 6) formed on the facial surface of the screen wires 2 and, as the rotary drum 10 is rotated, carried to a predetermined fiber collecting section (not shown) and collected therein.

In the illustrated embodiments, the projections 5 and depressions 7 are formed in the shape of a triangular cross section. The cross section of the projections 5 and the depressions 7 is not limited to this but it may be of one of other shapes such as semi-circular and square cross sections. The projections 5 and depressions 7 may extend obliquely instead of extending in lateral direction of the screen wire 2. The projections 5 and depressions 7 may be formed partially in lateral direction of the screen wire 2 instead of being formed over the entire width of the screen wire 2.

In the illustrated embodiments, the projections 5 and the depressions 7 of the screen wires 2 are aligned laterally for all of the screen wires 2. Alternatively, the projections 5 and the depressions 7 may be disposed in a staggered arrangement in the lateral direction of the screen wires 2.

As the screen wire 2, not only a wedge wire but also other screen wires having any desired cross sections such as circular, square, rhombic and hexagonal cross sections may be used.

What is claimed is:

1. A screen made of a plurality of screen wires and support rods, said screen wires being arranged to form slits between adjacent screen wires each of said adjacent screen wires having a flat facial surface with a plurality of projections formed on said flat facial surface of said screen wire at a predetermined interval said projections extending laterally or obliquely across the longitudinal axis of said screen wires each of said screen wires being welded to said support rods on the surface of said screen wires which is opposite to the facial surface of said screen wire.

2. A screen made of a plurality of screen wires and support rods, said screen wires being arranged to form slits between adjacent screen wires each of said adjacent screen wires having a flat facial surface with a plurality of depressions formed on said flat facial surface of said screen wire at a predetermined interval said depressions extending laterally or obliquely across the longitudinal axis of said screen wires each of said screen wires being welded to said support rods on the surface of said screen wires which is opposite to the facial surface of said screen wire.

3. A screen made of a plurality of screen wires arranged to form slits between adjacent screen wires said screen wires having a flat facial surface with a plurality of projections and depressions.

4. A screen made of a plurality of screen wires each of which has a plurality of projections at predetermined intervals, said plurality of projections being formed on a flat facial surface of said screen wires, said screen wires being arranged parallel to one another to define a slit between said screen wires.

5. A screen made of a plurality of screen wires each of which has a plurality of depressions at predetermined intervals, said plurality of depressions being formed on a flat facial surface of said screen wires, said screen wires being arranged parallel to one another to define a slit between said screen wires.

6. A screen made of a plurality of screen wires each of which has a plurality of projections and depressions at predetermined intervals, said plurality of projections and depressions being formed on a flat facial surface of said screen wires, said screen wires being arranged parallel to one another to define a slit between said screen wires.

7. A screen as defined in claim 4 wherein the projections have a triangular cross-section.

8. A screen as defined in claim 4 wherein the projections have a square cross-section.

9. A screen as defined in claim 4 where the projections have a semi-circular cross-section.

10. A screen as defined in claim 2 wherein the depressions have a triangular cross-section.

11. A screen as defined in claim 2 wherein the depressions have a square cross-section.

12. A screen as defined in claim 2 wherein the depressions have a semi-circular cross-section.

13. A screen as defined in claim 1 wherein the screen wire has a wedge shaped cross-section.

14. A screen as defined in claim 2 wherein the screen wire has a wedge shaped cross-section.

15. A screen as defined in claim 1 where the projections are arranged laterally.

16. A screen as defined in claim 1 where the projections are arranged obliquely.

17. A screen as defined in claim 2 where the projections are arranged laterally.

18. A screen as defined in claim 2 where the projections are arranged obliquely.

* * * * *